Patented Jan. 7, 1941

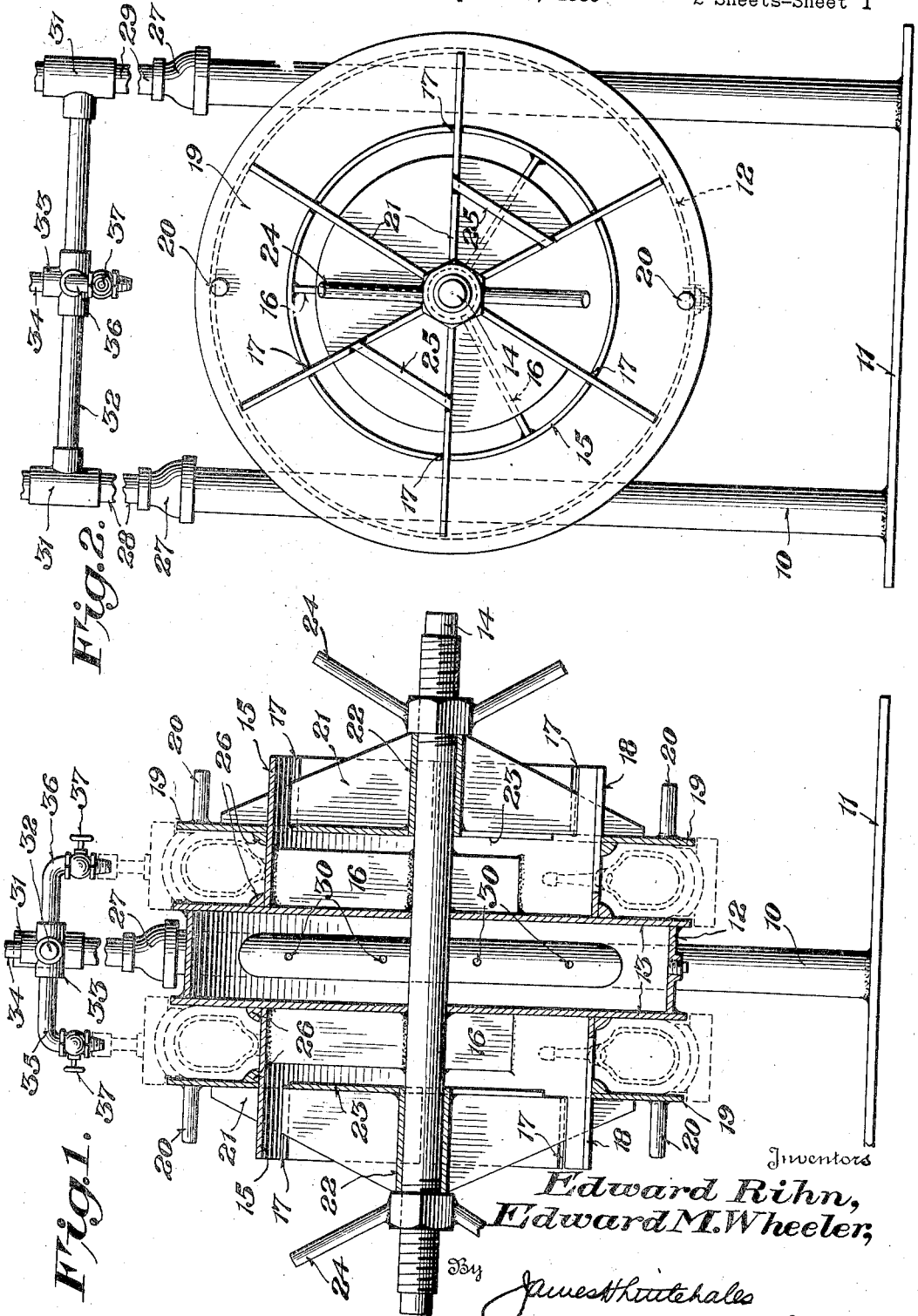

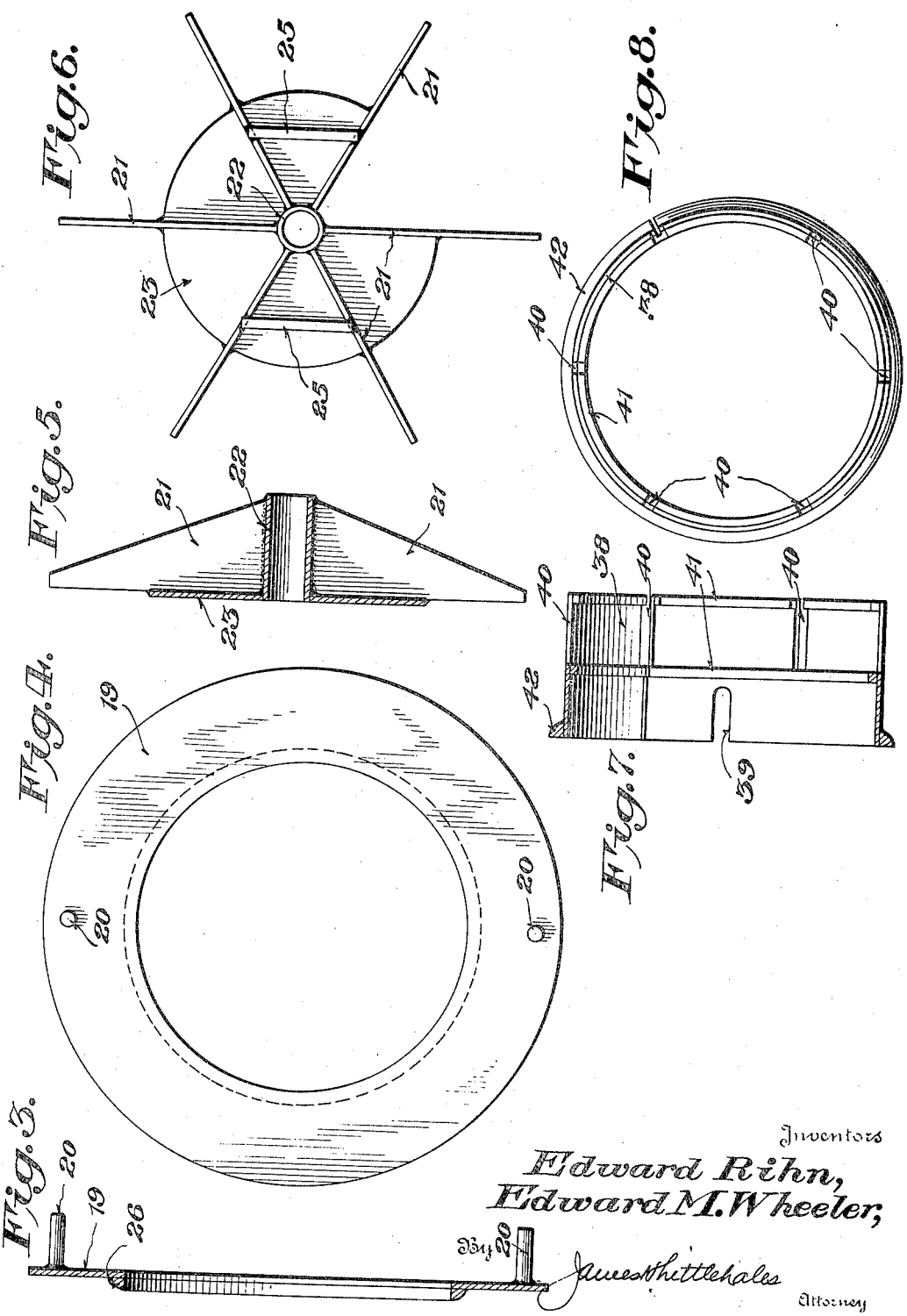

2,227,798

UNITED STATES PATENT OFFICE 2,227,798

TIRE RECAPPING TABLE

Edward D. Rihn, Ford City, and Edward M. Wheeler, New Kensington, Pa., assignors to C. J. Gross, Jacksonville, Fla.

Application April 17, 1939, Serial No. 268,360

6 Claims. (Cl. 18—18)

Our invention relates to a tire re-capping table upon which either one or a pair of worn tire casings may be positioned and securely retained with a minimum of preliminary adjustments to adapt the table to receive them, the side walls of the casing in position being confined between a pair of abutment plates, one of which is pressed into contact with the tire by a single screw means in such manner as to exert equal pressure upon the side wall at all points, and in other novel features of construction hereinafter to be described and claimed.

In re-capping worn tires it is customary to inflate the tire to a pressure higher than that specified for normal use and to enclose the tread portion of the tire in a circular matrix which retains the rubber to be applied. The matrix is usually made in sections which are clamped upon the partly inflated tire after which inflation is completed to press the tire tightly into engagement with it, but insofar as the apparatus of this invention is concerned it is immaterial whether it is in sections, or in the form of an annulus into which the uninflated tire is fitted and then expanded.

Because of the relatively high inflation of the tire it is necessary to confine it to prevent over-extension and possible blow-out. It is therefore usual practice to mount the tire upon a rim of generally similar shape in cross-section to the usual vehicle rim and to clamp side plates in contact with the side walls of the tire. The C-shaped clamps employed for this purpose may extend across the tread surface of the tire, in which case they must be applied after the matrix is in position but before the tire is inflated to high pressure. This makes for inconvenient handling and difficulty in maintaining the coaxial placement of the tire and matrix during inflation. Any canting of the tire in the matrix, or other misalignment, will result in an unsatisfactory and unsightly tread. If, however, the C-shaped clamps pass around the rim, some special mounting of the rim in the vulcanizer is required to accommodate them.

It is accordingly an object of our invention to eliminate these difficulties by supporting the tire upon an enlarged drum in vertical position and by pressing an adjustable side plate into contact with the tire through the medium of a screw which is coaxial with the drum, in such manner as not to interfere with the positioning of the matrix on the tire, or of the tire on the rim.

A still further object of our invention is to provide as part of the re-capping table support, a steam line closely adjacent the point of its connection to the tire matrices, so that the connection therewith may be quickly and easily made, and to eliminate the use of long lengths of flexible hose for the purpose.

Other and further objects will be apparent from the following description and drawings, wherein Figure 1 is a vertical sectional view of a recapping table embodying the features of our invention.

Figure 2 is an end view of the table.

Figure 3 is a cross-sectional view of an adjustable side pressure plate.

Figure 4 is a plan view of the adjustable pressure plate.

Figure 5 is a view, partly in section, of a spider through which pressure is applied to the adjustable plate.

Figure 6 is a plan view of the pressure applying spider.

Figure 7 is a cross-sectional view of a cylindrical collar which may be slid onto one of the tire receiving drums to increase its diameter.

Figure 8 is an end view of one of the collars.

Referring more particularly to the drawings:

The stand 10 may be constructed in any desired manner to furnish rigid support, but preferably it consists of a pair of tubular uprights which may be attached to a base 11 bolted to the floor, or embedded in concrete if desired for greater permanency.

A circular band 12 is welded to the spaced uprights which pass through it, and is likewise welded at its edges to a pair of abutment plates 13 through which a central shaft 14 extends.

Oppositely projecting drums 15, having radial supporting and strengthening webs 16, are welded or otherwise affixed to shaft 14 and to the abutment plates 13. Each drum is formed with a series of inwardly extending slots 17 for a purpose to be presently described, and a deeper slot 18 for reception of the valve of the air bag, so that the tire may be fully inflated after it has been mounted on the table.

Adjustable pressure plates 19, in the form of wide rings, are slidably received on the drums 15, and have handles 20 to facilitate mounting and removing them. They are pressed toward the fixed plates 13 by spiders each of which consists of a series of arms 21 extending radially outward from a sleeve 22 journalled on the shaft 14 and which has a base 23 of a diameter closely approaching that of the inside of the drum. The ends of the spider arms, beyond the base 23, extend through the slots 17 in the drum and bear upon the plate 19. The spiders are adjusted by means of hand wheels 24 which are threaded onto the ends of shaft 14, and for removing and replacing them handles 25 may conveniently be provided, as shown in Figures 2 and 6. One segment of the base 23, between adjacent spider arms is cut away (see Figure 6) to permit access to the air bag valve for inflating the tire when it is in position on the table.

Tire bead rings 26 surround the drums 15. These may be made integral with the fixed and adjustable pressure plates, or, if desired, they may be separately slid upon the drum preparatory to a re-capping operation.

At their upper ends the tubular standards have reducer nipple fittings 27 which connect them to water supply and return lines 28 and 29, and in those portions which enter the chamber defined by the band 12 and fixed abutment plates 13, they have holes 30 through which water enters the chamber and is withdrawn after circulating through it in cooling contact with the sides. At a low point in the chamber a drain plug may be provided, as shown in Figure 1. The stands 10 are blocked off below the point where they communicate with the cooling chamber to prevent leakage.

T-fittings 31 in the water lines 28 and 29 support a bar 32 which bridges the space between them and not only increases the rigidity of the stand but likewise serves to mount a pipe fitting 33 through which steam is delivered from pipe 34 and branches 35 and 36 to points closely adjacent the steam inlets of the tire matrices. Connection to the steam line can therefore be made quickly and conveniently, and the flow of heating fluid regulated by valves 37 which are in a position readily accessible to the operator.

Although not shown in the drawings, the fixed abutment plates 13 may be of different diameters to accommodate different sizes of tires on the respective drums, for they should not extend outwardly so far as to interfere with the matrices which, for some sizes of tires, may overhang the side plates.

Further, to accommodate tires of different diameters, cylindrical collars 38 such as are shown in Figures 7 and 8 are employed. These are slotted as at 39 to receive the valve of the air bag, and at 40 to permit projection of the spider arms into contact with the adjustable pressure plates. A series of spacing ribs 41 on the interior of the collar serve to hold it spaced from the drum when slid thereon. The shoulder 42 for abutment of the tire bead may be integral with the collar or, as in the case of the rings on the drums, may be separate therefrom.

Thus, it will be understood that our invention provides a re-capping table of simple and rugged construction, which is adapted to support tires of a wide variety of sizes ranging from those for pleasure cars to truck and bus tires, and which permits of simultaneous operations upon two tires either of the same or of different sizes, while confining the tires by adjustable side rings under pressure equally applied to all points along their side walls.

What we claim as our invention, and desire to secure by Letters Patent, is:

1. A tire re-capping table comprising a drum mounted upon a central shaft, a fixed abutment plate extending radially beyond said drum, an adjustable pressure plate slidable on said drum, a spider journalled on said shaft and having radial arms projected through slots in said drum into contact with said adjustable pressure plate, and means for forcing said spider along said shaft to apply pressure equally to the pressure plate at the points of contact of the spider arms therewith.

2. A tire re-capping table comprising a pair of oppositely directed drums, a pair of spaced abutment plates extending radially beyond the drums and constituting the side walls of a cooling chamber, connections in communication with such chamber for introducing cooling fluid thereinto, a pair of adjustable pressure plates slidable on said drums, a shaft passing axially through said drums, spiders received upon the opposite ends of said shaft and having radial arms projected through slots in said drums into contact with the respective adjustable pressure plates, and means for forcing said spiders along said shaft to apply pressure to each adjustable pressure plate equally at the points of contact of the arms therewith.

3. A tire re-capping table comprising a pair of tubular supports spaced apart and extending through a circular band to which they are secured, a pair of fixed abutment plates carried by said band and forming therewith a chamber into which cooling fluid may be introduced through openings in said tubular supports, a pair of oppositely extending drums projecting from said fixed abutment plates, a shaft coaxial therewith, a pair of adjustable pressure plates carried on the respective drums and means cooperating with said shaft for selectively advancing said adjustable pressure plates.

4. A tire-re-capping table comprising a pair of tubular supports spaced apart and extending through the wall of a cooling chamber secured thereto, a pair of drums extending laterally from opposite sides of such cooling chamber and adapted to mount tires with matrices surrounding their tread portions and with their side walls in contact with the sides of the cooling chamber, adjustable pressure plates in contact with the other side walls of the tires to confine them, means to urge said adjustable pressure plates into contact with the tires in process, the said tubular supports being formed with openings in communication with the cooling chamber and connected to the supply and outlet of a water system, a rigid arm connecting the spaced tubular supports, and a steam supply fitting carried by said arm with branches leading to points in proximity to the matrices of the tires in process.

5. A tire re-capping table comprising a pair of coaxial, laterally extending drums having radial webs for attachment to a central shaft, a pair of fixed abutment plates extending radially outward beyond the drums for a distance requisite for contacting the side walls of the tires in process and having tire bead shoulders, a circular band attached to the fixed abutment plates to define with them a cooling chamber, piping communicating with such chamber for the circulation of cooling fluid therethrough, a pair of adjustable pressure plates slidable on said drums and having tire bead shoulders corresponding to those on the abutment plates, said adjustable pressure plates being of sufficient diameter to contact the opposite side walls of the tires in process, spiders journalled on the opposite ends of said central shaft, each having a plurality of radial arms extending beyond a base which is received within its respective drum, and projected through slots in the drum for engagement with the adjustable pressure plate with which it is associated, and screw means for advancing the spiders and moving said adjustable pressure plates into engagement with the side walls of the tires in process, thereby to confine the tires securely, each of said drums being further slotted for projection of the inflation valve of an air bag therethrough into its interior, and the said spider base being formed with an opening for access to the inflation valve.

6. In a tire re-capping table, a supporting drum of suitable diameter for receiving tires of average size, means for adapting the drum to support tires of larger sizes, said means comprising a cylindrical collar of larger diameter than the drum, and spacing ribs attached to the inner surface of said collar, the said drum and collar being similarly slotted for projection of an air bag inflation valve therethrough.

EDWARD D. RIHN.
EDWARD M. WHEELER.